United States Patent
Pirvu et al.

(10) Patent No.: US 9,547,489 B2
(45) Date of Patent: Jan. 17, 2017

(54) SYSTEM AND METHOD FOR MODIFYING A SEQUENCE OF INSTRUCTIONS IN A READ-ONLY MEMORY OF A COMPUTING DEVICE

(71) Applicant: Qualcomm Incorporated, San Diego, CA (US)

(72) Inventors: Eugen Pirvu, Mission Viejo, CA (US); Dhamim Packer Ali, San Diego, CA (US); Ashutosh Jagdish Shrivastava, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 174 days.

(21) Appl. No.: 14/307,415

(22) Filed: Jun. 17, 2014

(65) Prior Publication Data
US 2015/0277894 A1  Oct. 1, 2015

Related U.S. Application Data

(60) Provisional application No. 61/973,203, filed on Mar. 31, 2014.

(51) Int. Cl.
*G06F 9/00* (2006.01)
*G06F 9/445* (2006.01)
*G06F 21/57* (2013.01)

(52) U.S. Cl.
CPC .............. *G06F 8/66* (2013.01); *G06F 21/575* (2013.01)

(58) Field of Classification Search
CPC .................................. G06F 21/575; G06F 8/66
USPC ................. 714/6.13, 726; 711/102, 202, 103
See application file for complete search history.

(56) References Cited

U.S. PATENT DOCUMENTS

| | | | | |
|---|---|---|---|---|
| 4,028,678 A | | 6/1977 | Moran | |
| 6,128,751 A | * | 10/2000 | Yamamoto | ............... G06F 9/328 714/6.13 |
| 6,141,740 A | * | 10/2000 | Mahalingaiah | ............ G06F 8/66 711/125 |
| 6,237,120 B1 | * | 5/2001 | Shimada | .................... G06F 8/66 714/726 |

(Continued)

OTHER PUBLICATIONS

Dawkins, G.J. et al., Algorithm to Allow a Computer System's BootROM in Compressed Form, IBM Technical Disclosure Bulletin, Apr. 1, 1994.

(Continued)

*Primary Examiner* — Aurel Prifti
(74) *Attorney, Agent, or Firm* — Smith Tempel

(57) ABSTRACT

A system and method for patching a boot sequence in a read-only memory. Patch instances are provided in an addressable memory. The patch instances are initially empty. The read-only memory includes a process that dynamically vectors to identified locations in a set of addressable memory locations in the addressable memory. Thereafter, the process returns to the next subsequent instruction following the patch instance. As corrections are required, the one or more patch instances are populated with one or more respective patches. The boot sequence is modified by inserting one or more patch indicators located where patches might need to be applied after a system-on-chip (SoC) is embodied in firmware. The patches, when defined, are populated with at least an encoded instruction type and an address. Accordingly, a patch is enabled in no more than three words.

10 Claims, 13 Drawing Sheets

(56) References Cited

U.S. PATENT DOCUMENTS

| | | | | |
|---|---|---|---|---|
| 6,260,157 B1* | 7/2001 | Schurecht | | G06F 8/66 711/202 |
| 6,925,521 B2* | 8/2005 | Li | | G06F 8/66 711/103 |
| 7,039,776 B2 | 5/2006 | Wong et al. | | |
| 7,302,605 B2* | 11/2007 | Goodnow | | G06F 8/66 714/6.13 |
| 7,464,248 B2* | 12/2008 | Chen | | G06F 12/0638 711/102 |
| 7,523,299 B2* | 4/2009 | Yu | | G06F 8/66 713/2 |
| 2002/0124161 A1* | 9/2002 | Moyer | | G06F 8/66 712/234 |
| 2003/0217227 A1* | 11/2003 | Parthasarathy | | G06F 8/66 711/118 |
| 2004/0237068 A1* | 11/2004 | Ren | | G06F 8/665 717/110 |
| 2006/0174244 A1* | 8/2006 | Woods | | G06F 8/66 717/174 |
| 2006/0265692 A1* | 11/2006 | Su | | G06F 8/66 717/124 |
| 2007/0014136 A1* | 1/2007 | Ali | | G11C 29/76 365/1 |
| 2007/0294496 A1* | 12/2007 | Goss | | G06F 12/1408 711/163 |
| 2009/0031121 A1* | 1/2009 | Henry | | G06F 8/66 712/226 |
| 2009/0271593 A1* | 10/2009 | Hsu | | G06F 8/66 712/226 |
| 2010/0106953 A1 | 4/2010 | Morad et al. | | |
| 2010/0223602 A1* | 9/2010 | Kreek | | G06F 8/64 717/140 |
| 2011/0107070 A1* | 5/2011 | Barbulescu | | G06F 8/66 712/226 |
| 2011/0252413 A1* | 10/2011 | Maeda | | G06F 8/66 717/168 |
| 2014/0208066 A1* | 7/2014 | Bradbury | | G06F 15/8053 712/7 |
| 2015/0212213 A1* | 7/2015 | Sakumura | | G01N 23/207 378/64 |
| 2015/0309885 A1* | 10/2015 | Li | | G06F 11/1469 707/674 |

OTHER PUBLICATIONS

International Search Report—PCT/US2015/023375—ISA/EPO—Jun. 5, 2015. (141456WO).

Weiss, et al., "Microcode Patch Facility", ip.com Journal, ip.com Inc., West Henrietta, NY, US, Apr. 1, 1983, XP813835292, ISSN: 1533-8881.

Robson N., et al., "Electrically Programmable Fuse (eFUSE): From Memory Redundancy to Autonomic Chips", Custom Integrated Circuits Conference, 2007, CICC '07, IEEE, IEEE, Piscataway, NJ, USA, Sep. 16, 2007 (Sep. 16, 2007), pp. 799-804, XP031223710, ISBN: 978-1-4244-0786-6.

\* cited by examiner

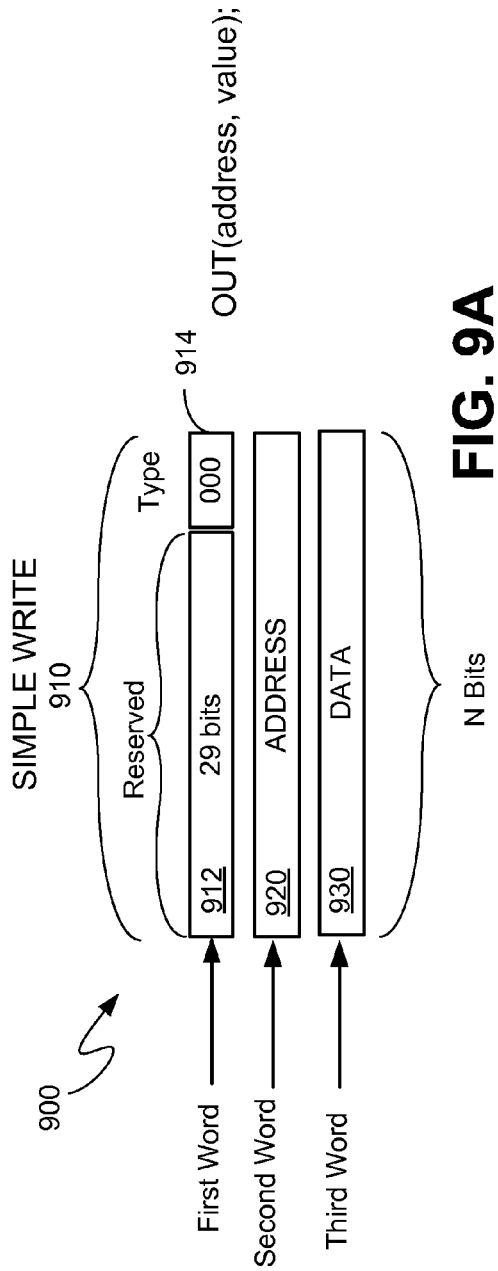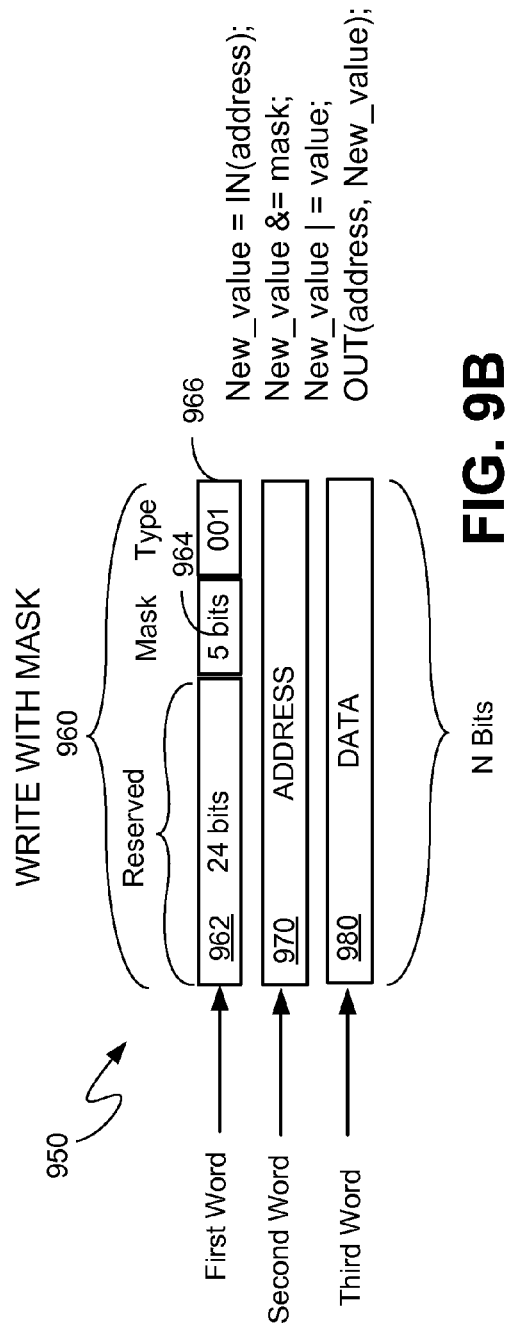

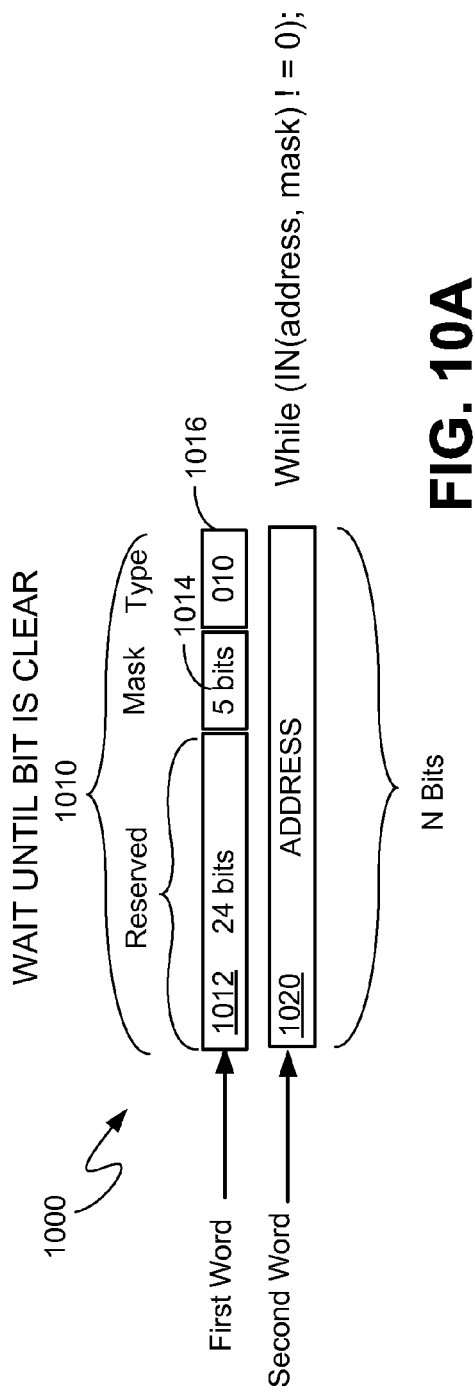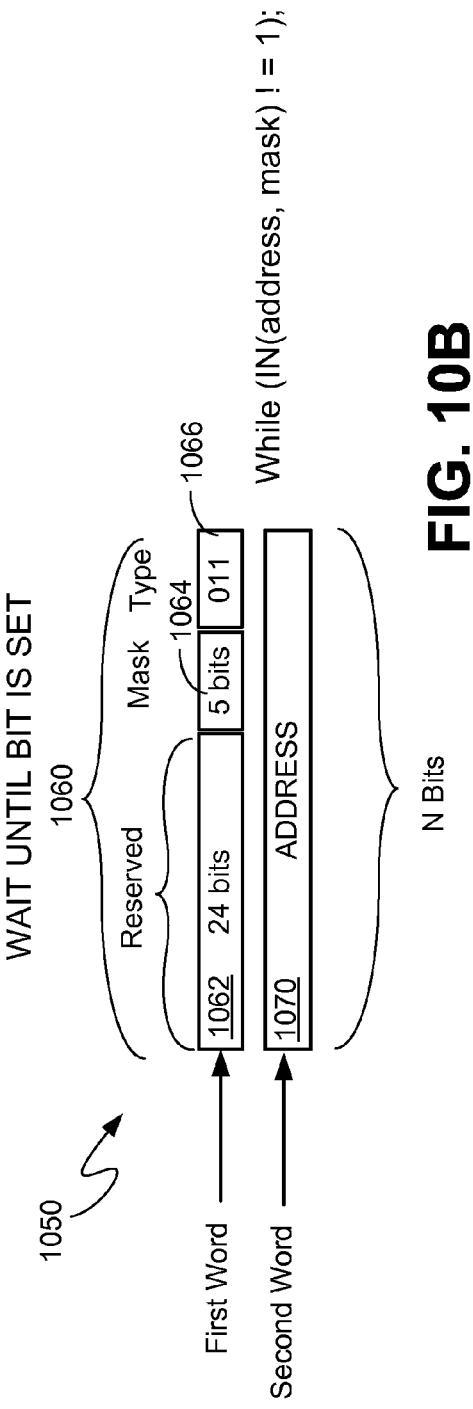

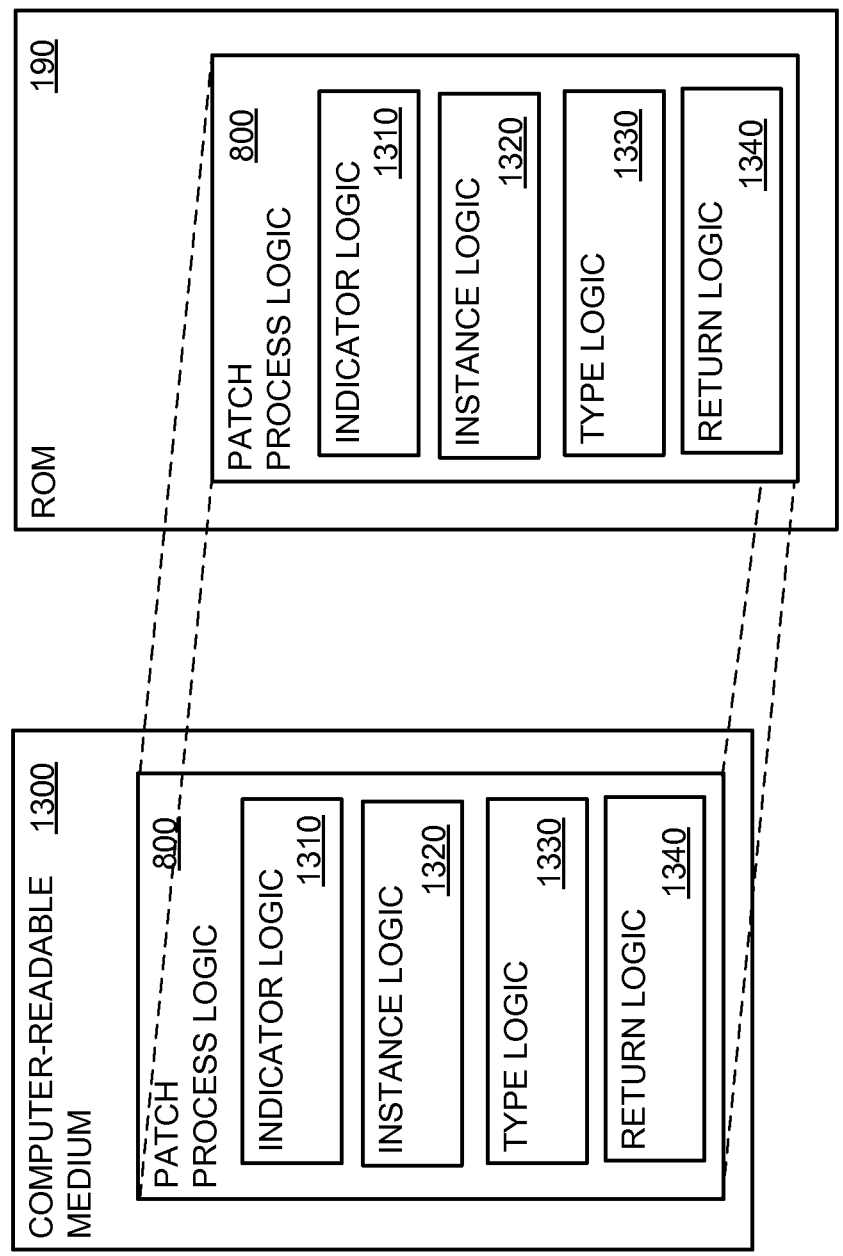

SYSTEM AND METHOD FOR MODIFYING A SEQUENCE OF INSTRUCTIONS IN A READ-ONLY MEMORY OF A COMPUTING DEVICE

RELATED APPLICATION

The present application claims priority to and the benefit of the filing date of U.S. Provisional Application No. 61/973,203, entitled "System and Method for Modifying Firmware Used to Initialize a Computing Device" filed on Mar. 31, 2014, the entirety of which is incorporated into this document by reference.

DESCRIPTION OF THE RELATED ART

Computing devices are ubiquitous. Some computing devices are portable such as mobile phones, tablets, and laptop computers. As the functionality of such portable computing devices increases, the computing or processing power required and generally the data storage capacity to support such functionality also increases. In addition to the primary function of these devices, many include elements that support peripheral functions. For example, a cellular telephone may include the primary function of enabling and supporting cellular telephone calls and the peripheral functions of a still camera, a video camera, global positioning system (GPS) navigation, web browsing, sending and receiving emails, sending and receiving text messages, push-to-talk capabilities, etc. Many of these portable devices include a system-on-chip (SoC) to enable one or more primary and peripheral functions on the specific device.

A SoC generally comprises a processor embedded in an integrated circuit or chip which is coupled to a local bus. The SoC will generally include hardware components and other processors. The SoC, like larger computing devices such as desktop and server computers relies on a boot sequence or a boot code upon powering up. The boot sequence is the initial set of operations that the SoC performs when power is first applied to the SoC. The boot code enables a (i.e., bootstrapping) process that initializes the SoC.

The boot code is typically stored in a read-only memory (ROM) for quick access, low complexity, spatial efficiency, low cost, and security reasons. The ROM, otherwise known as a masked or boot ROM, has its code hardwired and thus cannot be reprogrammed later. This allows greater security against reverse engineering of proprietary code and against cryptographic attacks.

In a typical SoC design process, the boot ROM is defined well before other portions of the SoC have been completed. Complexity in the circuit architectures, feature sets, next generation market trends, performance improvements, identified security vulnerabilities and pre-silicon verification limitations have led to conventional boot ROM designs with limited adaptability to enable changes post tape out of the SoC. In these conventional designs the boot ROM firmware is backed up with one time programmable fuses that can enable instructions or statements and data to be replaced during runtime execution.

FIG. 1 includes a schematic diagram illustrating how patches work in an example conventional boot processor 10 of a computing device. As illustrated, the boot processor 10 includes a boot ROM 12 including boot code or code 20, a secured controller 14, one time programmable fuses 16 and multiplexer logic 18. The secured controller 14 includes a patch region 15, which includes a fixed number of addresses associated with respective data fields. In the example embodiment the patch region 15 includes 48 such addresses. The secured controller 14 also includes a memory 17. Prior to patching, the patch region 15 is empty and the one-time programmable fuses 16 are all intact. When a patch or change is required, one or more of the one-time programmable fuses are modified to generate an open circuit condition. In addition, one or more of the addresses and corresponding data fields are modified to include address and data information. The open circuit condition directs the secured controller 14 to insert a patched address and the corresponding data in place of the original boot ROM data. The multiplexer logic 18 controllably forwards boot ROM data or patched data as desired to a processor (not shown) coupled to the boot processor 10.

For instruction patching it is often the case that the patch or modification cannot be made in place. That is, a branch out instruction is required to use previously non-used memory to add the replacement or new instructions. Thereafter, a branch back instruction is required to return to the original boot code. FIG. 2 includes a schematic diagram that illustrates how patches are enabled in the conventional boot processor 10 of FIG. 1. Code 20 includes a sequence of instructions or statements. The code 20 is defined by an address 22 and a statement or instruction 24. Code addresses begin with 0x00000000 and end with the last instruction or statement in the code 20. An original and unmodified code 20 includes instructions or statements A through XX. A branch out instruction or patch 30 is inserted between Statement C and Statement D. Patch addresses 32 begin with 0x10000000 and end with the last instruction or statement required to complete the patch 30. Each patch address 32 is associated with a corresponding statement or instruction 34. As shown in FIG. 2, a total of five addresses are consumed when implementing the patch 30. A first address is consumed to insert the jump or branch instruction in the code 20. Two additional addresses are consumed with the new instructions in the patch 30. For purposes of illustration the OUT instructions are described as using one address when in fact an OUT instruction consumes more than one address. An additional address is used to replace or restore Statement D, which was overwritten with the jump or branch instruction. A fifth address is used to jump back to the next subsequent statement or instruction in the code 20. Thus, five addresses are consumed to insert two new instructions in the boot code 20.

Despite this flexibility the total die area cost and additional circuitry needed to multiplex address and data forces the one-time programmable fuses 16 to be available in a limited quantity. Furthermore, the limited number of one time programmable fuses 16 available must be shared with other one time programmable fuse 16 needs in the SoC.

In addition to the difficulties involved in repairing bugs in the ROM code 20, it is also complicated to add new features to the ROM code 20. Such additional features may be determined by a system designer to be desirable after the ROM has already been programmed and fabricated within the SoC.

Thus, there is a need for improved mechanisms for securely modifying a boot sequence or other code hardwired in a read-only memory.

SUMMARY OF THE DISCLOSURE

Example embodiments of systems and methods are disclosed that enable a patch to be applied to a boot sequence or other sequence of instructions stored in a read-only memory (ROM). An original boot sequence is modified by inserting a patch indicator at a location in the boot sequence where a patch is likely to be desired after the SoC is embodied in firmware. Any number of patch indicators may be inserted in the original boot sequence to create a modified boot sequence. A patch instance is initially empty and stored in a programmable memory accessible to a controller that loads instructions and data in a processor. The ROM includes patch processing logic that when executed by a processor dynamically vectors to the patch instance identified by the patch indicator and thereafter returns to the next subsequent instruction in the boot sequence. As patches are desired, an instruction type is encoded in a first word and a patch address is provided in a second word of the patch. For some instruction types a third word is populated with data.

An example embodiment of an improved system for patching a sequence of instructions stored in a read-only memory (ROM) includes a programmable read-only memory or PROM, the ROM, a random-access memory (RAM), a controller and a processor. The PROM provides a set of addressable memory locations. The ROM has stored therein a sequence of instructions and patch processing logic arranged to dynamically vector to identified (i.e., addressable) locations in the set of addressable memory locations in the PROM and return to the sequence of instructions in the ROM. The RAM is coupled to the PROM and ROM via a bus. The controller loads the sequence of instructions and patch processing logic from the ROM to the RAM. The processor is coupled to the RAM via the bus and executes the sequence of instructions. When a patch indicator is encountered in the sequence of instructions, the processor executes the patch processing logic.

An example embodiment of a method for modifying a sequence of instructions in a read-only memory includes the steps of providing a set of addressable memory locations coupled to a processor, providing a set of one time programmable fuses coupled to the processor, providing a sequence of instructions in a read-only memory coupled to the processor and enabling a patch process in the read-only memory that dynamically vectors to identified locations in the set of addressable memory locations and returns to the sequence of instructions in the read-only memory, wherein when it is desired to modify the sequence of instructions, information in the set of one time programmable fuses directs the processor to execute at least one instruction from a patch.

An example embodiment of a non-transitory processor-readable medium having stored thereon processor instructions that when executed direct the processor to perform functions, includes logic that when executed by the processor directs the processor to perform the steps of identifying when a patch indicator is present in a sequence of instructions, determining when a patch instance is available at an address associated with the patch indicator, such that when a patch instance is not available, the processor loads and executes a next subsequent instruction from the sequence of instructions. Otherwise, when a patch instance is available, the processor performs the steps of determining a patch type from information stored at the address associated with the patch indicator and executing at least one instruction from the patch instance.

Another example embodiment of an improved system for patching a sequence of instructions includes a means for providing a set of addressable memory locations, having stored therein at least one patch instance, a means for storing a sequence of instructions and patch processing logic that when executed by a means for executing the sequence of instructions dynamically vector to identified locations in the set of addressable memory locations and return to the sequence of instructions, a means for temporarily storing the sequence of instructions and patch processing logic, a means for loading the sequence of instructions and the patch processing logic from the means for storing to the means for temporarily storing and a means for executing the sequence of instructions from the means for temporarily storing, wherein when a patch indicator is encountered in the sequence of instructions, the means for executing executes the patch processing logic.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

FIGS. 9A &9B illustrate example embodiments of a write instruction and a write with mask, respectively.

FIGS. 10A &10B illustrate example embodiments of a wait until a bit is clear instruction and a wait until a bit is set instruction, respectively.

FIG. 13 is a schematic diagram illustrating an embodiment of a computer-readable medium.

DETAILED DESCRIPTION

Figure 1:
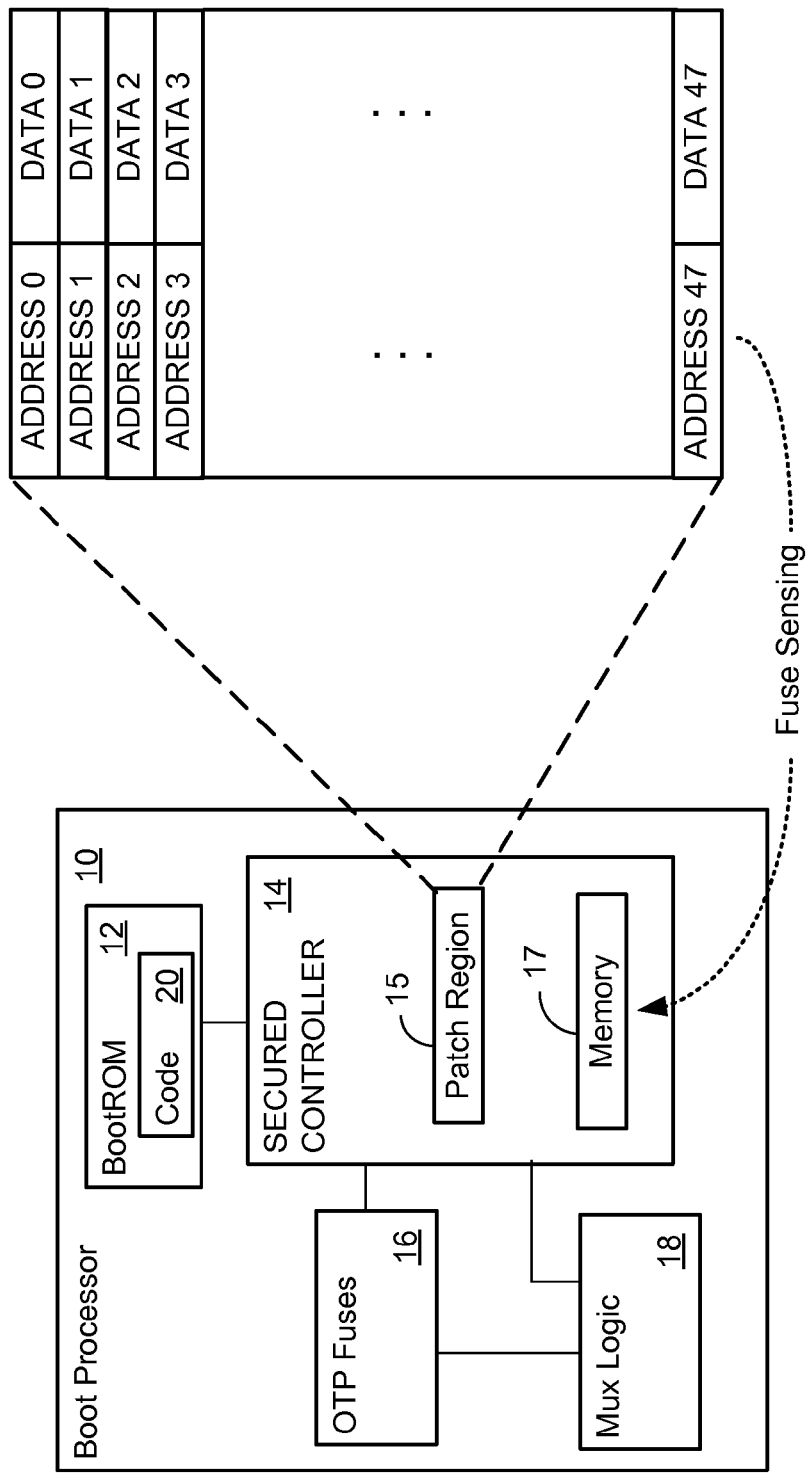
FIG. 1 is a schematic diagram illustrating how patches work in a conventional boot processor.
Figure 2:
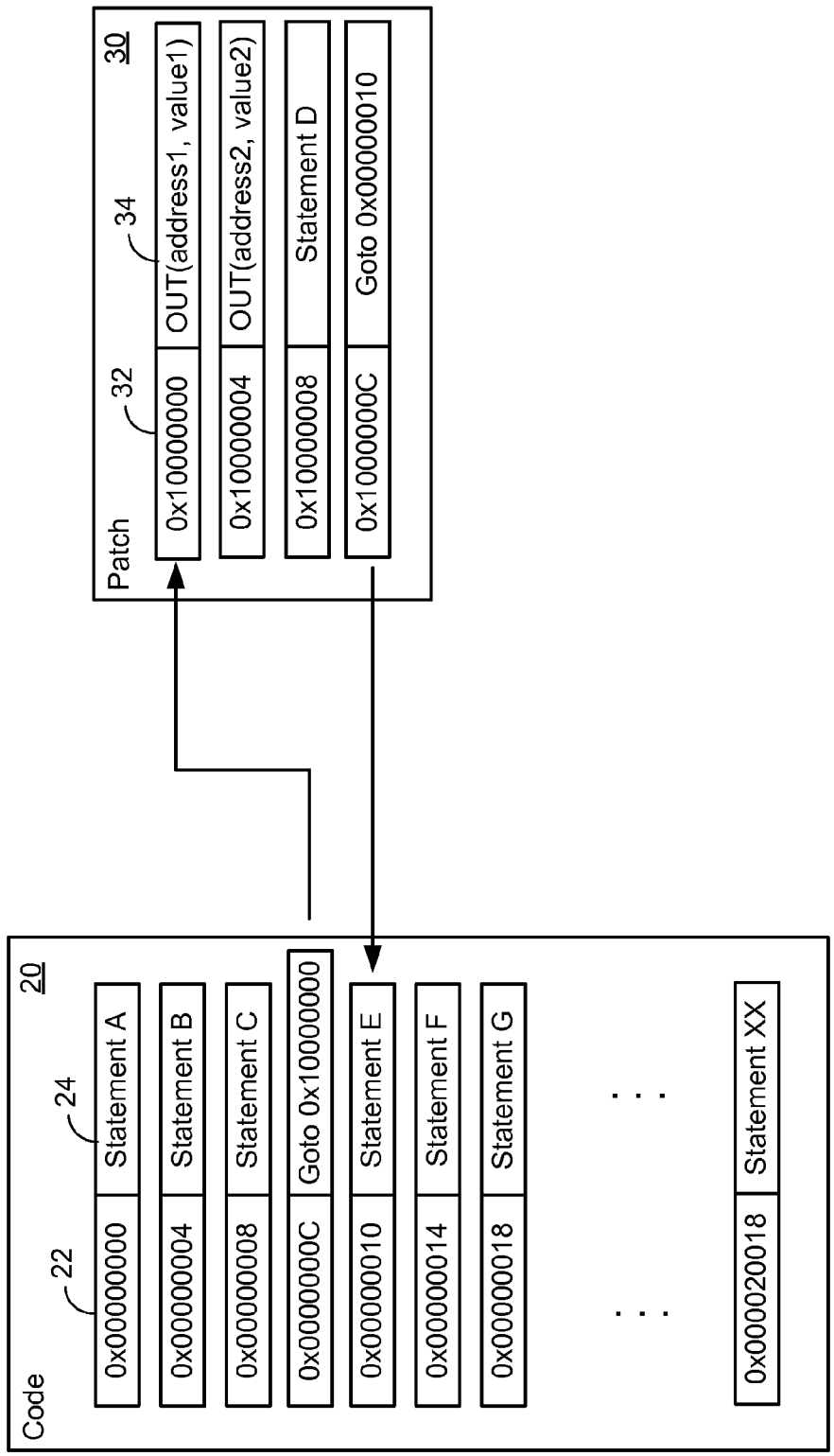
FIG. 2 is a schematic diagram illustrating how patches are enabled in the conventional boot processor of FIG. 1.

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files or data values that need to be accessed.

As used in this description, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer-readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the term "portable computing device" ("PCD") is used to describe any device operating on a limited capacity rechargeable power source, such as a battery and/or capacitor. Although PCDs with rechargeable power sources have been in use for decades, technological advances in rechargeable batteries coupled with the advent of third generation ("3G") and fourth generation ("4G") wireless technology have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, a laptop or tablet computer with a wireless connection, among others.

A system and method for patching a boot sequence in a hardwired or boot ROM are disclosed. An original or unmodified boot sequence is stored in the ROM. The original or unmodified boot sequence is pre-loaded with one or more patch instances. The patch instances are strategically located where patches might need to be applied after a system-on-chip (SoC) is embodied in firmware. These patch instances are initially empty. The patch instances are stored in a programmable memory accessible to a controller coupled to a random access memory (RAM) and a processor. The ROM includes a process that dynamically vectors to identified locations in a set of addressable memory locations in the programmable memory. Thereafter, the process returns to the next subsequent instruction following the patch instance. As corrections are desired, the one or more patch instances are populated with respective patches. The patches include an instruction type, an address, and a return indicator. In some variations, the patches also include a data field. Accordingly, a patch is enabled in no more than 4 words.

The present system and method for modifying firmware used to boot a computing device define a set of common instructions used in boot ROM patches or modifications. By pre-defining common instructions and using the same with an embedded or stored process for vectoring or jumping to addressable memory locations in a PROM or other available memory and returning to the boot ROM upon completion of the patch, the present system and methods optimize the total use of the limited one-time programmable fuses while enabling boot ROM modifications post silicon tape out.

Although described with particular reference to operation within a PCD, the described systems and methods are applicable to any computing system with a boot sequence in a ROM where it may be useful to patch or modify the original boot sequence to avoid the costs associated with an entire replacement of the ROM. Stated another way, the systems and methods disclosed herein are applicable to desktop computers, server computers or any electronic device with an embedded boot sequence stored in a ROM.

Figure 3:
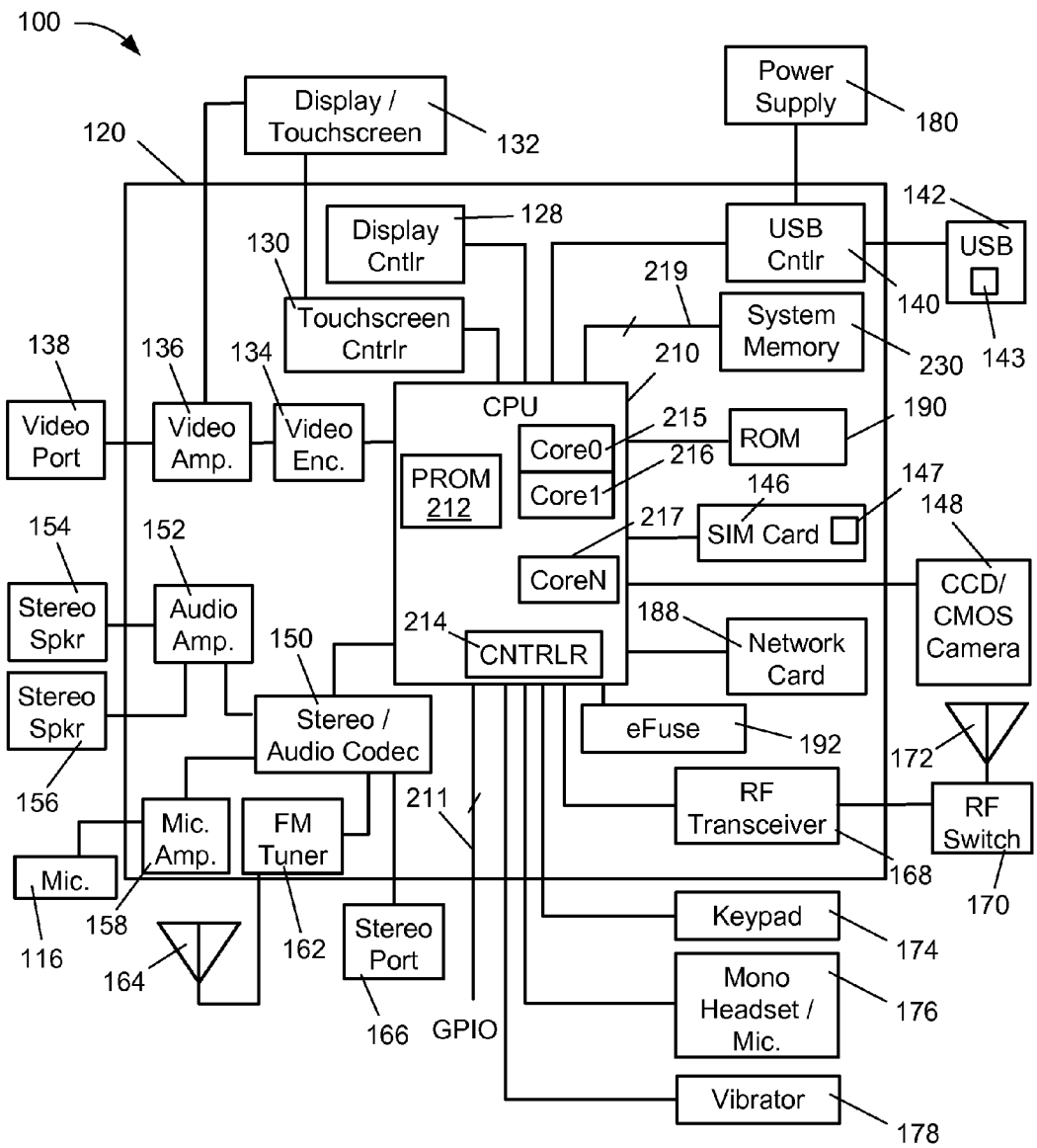
FIG. 3 is a schematic diagram illustrating an example embodiment of a computing device that includes an improved ROM patch process.

Reference is now directed to the illustrated examples. Referring initially to FIG. 3, an exemplary, non-limiting aspect of a PCD 100 is shown. The PCD 100 includes an on-chip system or SoC 120 that includes a multicore CPU 210. The multicore CPU 210 includes a zero$^{th}$ core 215, a 1$^{st}$ or first core 216, and an N$^{th}$ core 217. Each of the N cores are independent from each other and arranged to process instructions such as add, move data, branch, etc. The multicore CPU 210 is coupled to a general-purpose input output (GPIO) bus 211, and is arranged to include at least one programmable memory or PROM 212, and a controller 214. Each of the N cores operates in conjunction with signals communicated on the GPIO bus 211 or from an eFuse element 192, as well as instructions received from the ROM 190, the system memory 230 or programs or files 143 stored in a USB enabled data store 142.

The GPIO bus 211 may be configured to send signals from the CPU 210 to any peripheral devices external to the on-chip system 120 or conversely to receive signals from any devices external to the on-ship system 120. Such peripheral devices may include one or more of those illustrated in FIG. 1 or in some cases devices not shown in FIG. 1. As will be explained, the GPIO bus 211 may be used to direct the SoC 120 to enter and operate in a desired mode of operation where executable processor instructions are downloaded from a storage device coupled to the SoC 120. In addition, the GPIO bus 211 may be used to adjust or modify data stored in the PROM 212 and/or to configure the eFuse element 192.

In the illustrated arrangement the PROM 212 is an internal (integrated) memory element capable of storing data that may be retrieved by any of the N cores at a desired time as determined by the respective cores. The PROM 212 is configured to provide a set of storage locations that are designated for respective patches or sets of instructions.

The controller 214 is coupled to each of the N cores and is configured to access and provide instructions and data from any of the various storage devices (both internal and external to the multicore CPU 210) in a controlled manner to the N cores or the other various processors within the SoC 120. In the present system, the controller 214 is configured to operate as a tightly-coupled memory for the retrieval of processor instructions, status information and vector or branch logic.

The read-only memory (ROM) 190 is an integrated circuit that includes the code or codes that are executed by the CPU 210 during an initial power-on or upon a watchdog reset condition. Preferably, the ROM is enabled in firmware.

As illustrated in FIG. 3, a display controller 128 and a touch screen controller 130 are coupled to the multicore CPU 210. In turn, display/touchscreen 132, external to the on-chip system 120, is coupled to the display controller 128 and the touch screen controller 130.

FIG. 3 further indicates that a video encoder 134, e.g., a phase alternating line (PAL) encoder, a sequential couleur a memoire (SECAM) encoder, or a national television system (s) committee (NTSC) encoder, is coupled to the multicore CPU 210. Further, a video amplifier 136 is coupled to the video encoder 134 and the display/touchscreen 132. Also, a video port 138 is coupled to the video amplifier 136. As depicted in FIG. 3, a universal serial bus (USB) controller 140 is coupled to the multicore CPU 210. Also, a USB storage device 142 is coupled to the USB controller 140. A file 143, stored in the USB storage device 142, is available to be transferred to the system memory 230. In addition, a subscriber identity module (SIM) card interface 146 may also be coupled to the multicore CPU 210 with the connection 219 between the multicore CPU 210 and the system memory 230 consisting of two or more physical channels or paths for transferring data between these elements of the SoC 120. Further, as shown in FIG. 3, a digital camera 148 may be coupled to the multicore CPU 210. In an exemplary aspect, the digital camera 148 is a charge-coupled device (CCD) camera or a complementary metal-oxide semiconductor (CMOS) camera.

As illustrated in FIG. 3, a stereo audio CODEC 150 may be coupled to the multicore CPU 210. Moreover, an audio amplifier 152 may be coupled to the stereo audio CODEC 150. In an exemplary aspect, a first stereo speaker 154 and a second stereo speaker 156 are coupled to the audio amplifier 152. FIG. 3 shows that a microphone amplifier 158 may be also coupled to the stereo audio CODEC 150. Additionally, a microphone 116 may be coupled to the microphone amplifier 158. In a particular aspect, a frequency modulation (FM) radio tuner 162 may be coupled to the stereo audio CODEC 150. Also, a FM antenna 164 is coupled to the FM radio tuner 162. Further, a stereo port 166 may be coupled to the stereo audio CODEC 150.

FIG. 3 also indicates that a radio frequency (RF) transceiver 168 is coupled to the multicore CPU 210. An RF switch 170 may be coupled to the RF transceiver 168 and an RF antenna 172. As shown in FIG. 3, a keypad 174 is coupled to the multicore CPU 210. Also, a mono headset with a microphone 176 may be coupled to the multicore CPU 210. Further, a vibrator device 178 may be coupled to the multicore CPU 210. FIG. 3 further shows that a power supply 180 may be coupled to the on-chip system 120 via the USB controller 140. In a particular aspect, the power supply 180 is a direct current (DC) power supply that provides power to the various components of the PCD 100 that require power. Further, in a particular aspect, the power supply 180 is a rechargeable DC battery or a DC power supply that is derived from an alternating current (AC) to DC transformer that is connected to an AC power source.

FIG. 3 further indicates that the PCD 100 may also include a network card 188 that may be used to access a data network, e.g., a local area network, a personal area network, or any other network. The network card 188 may be a Bluetooth network card, a WiFi network card, a personal area network (PAN) card, or any other network card well known in the art. Further, the network card 188 may be incorporated in an integrated circuit. That is, the network card 188 may be a full solution in a chip, and may not be a separate network card 188.

As depicted in FIG. 3, the display/touchscreen 132, the video port 138, the USB port 142, the camera 148, the first stereo speaker 154, the second stereo speaker 156, the microphone 116, the FM antenna 164, the stereo port 166, the RF switch 170, the RF antenna 172, the keypad 174, the mono headset 176, the vibrator 178, and the power supply 180 are external to the on-chip system 120.

RF transceiver 168, which may include one or more modems, supports one or more of global system for mobile communications ("GSM"), code division multiple access ("CDMA"), wideband code division multiple access ("W-CDMA"), time division synchronous code division multiple access ("TDSCDMA"), long term evolution ("LTE"), and variations of LTE such as, but not limited to, FDB/LTE and PDD/LTE wireless protocols.

In the illustrated embodiment, a single instance of a multi-core CPU 210 is depicted. However, it should be understood that any number of similarly configured multi-core CPUs can be included to support the various peripheral devices and functions associated with the PCD 100. Alternatively, a single processor or multiple processors each having a single arithmetic logic unit or core could be deployed in a PCD 100 or other computing devices to support the various peripheral devices and functions associated with the PCD 100 as may be desired.

Figure 4:
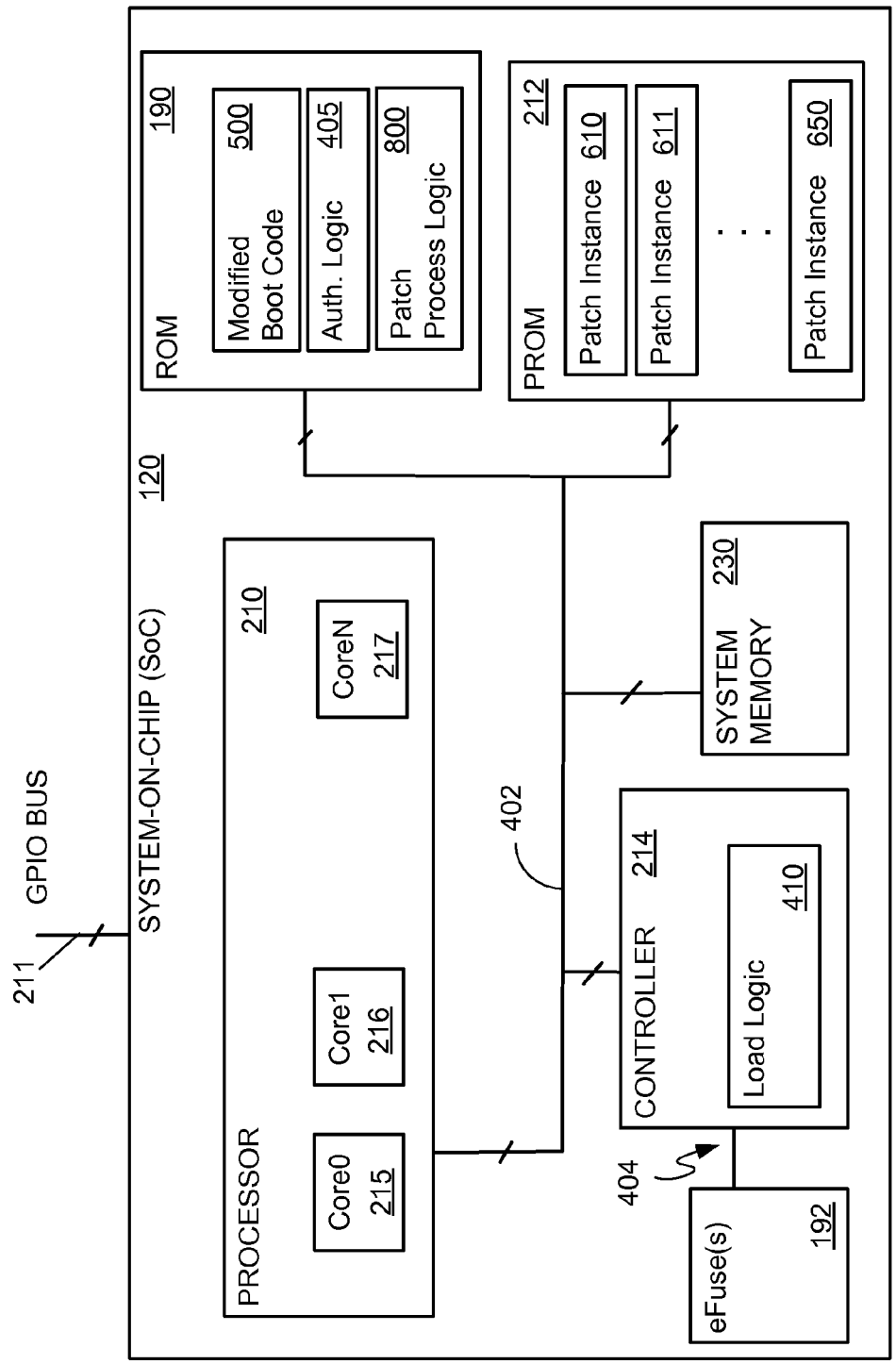
FIG. 4 is a schematic diagram illustrating an example embodiment of a system that enables an improved ROM patch process.

FIG. 4 is a schematic diagram illustrating an example embodiment of a SoC based system that enables an improved ROM patch process. The SoC 120 includes the ROM 190, PROM 212, multicore processor 210, controller 214, eFuse element 192, and system memory 230 introduced in the PCD 100 of FIG. 3. In the arrangement illustrated in FIG. 4, each of the processor 210, the controller 214, the system memory 230, the ROM 190 and the PROM 212 are coupled to a bus 402, which enables the transfer of data and instructions to and from the multicore processor 210 and each of the storage elements (i.e., the ROM 190, the PROM 212 and the system memory 230. The eFuse element 192, which includes M separate fuses where M is an integer, is coupled to the controller via a connection 404. The M separate fuses are provided in a limited quantity and often must be shared with other mechanisms on the PCD 100. The M separate fuses in the eFuse element 192 provides a set of one time programmable fuses that are coupled to the controller 214 and the multicore processor 210 via the connection 404 and the bus 402. When the multicore processor 210 is executing the instructions in the modified boot code 500, the multicore processor 210 retrieves an address by accessing the set of one time programmable fuses to authenticate and define an addressable location where a patch instance, such as one of the patch instance 610, patch instance 611 or another patch instance 650 is stored.

In this embodiment the modified boot code 500 is provided in the ROM 190. As briefly explained, a modified boot code 500 includes a sequence of instructions and one or more patch indicators that when executed by the multicore processor 210 initialize the PCD 100. The instructions may include the transfer of critical elements of an operating system into various registers of the multicore processor 210 (not shown). Alternatively, an original boot code is stored on ROM 190, during the manufacturing of the SoC 120. An original boot code may or may not include the one or more patch indicators.

The patch instances, i.e. the instructions and data that together form the patching commands, are preferably stored in PROM 212, where the patch instances may include bug fixes, new features, new data, hardware input/output fixes or other alterations to the original boot code or modified boot code 500 stored on ROM 190. When populated, for example, with instructions and data, the patch instances 610, 611, . . . , 650 include patch data. The patch instances 610, 611 through patch instance 650 may be stored in a number of formats and ways, such as storing pairs of addresses and instructions, meaning, that a requested patching command is written as a new command with an attached address. When stored in the PROM 212 and/or the system memory 230, the patch instances 610, 611, . . . , 650 are placed or located at an addressable location such that the controller 214 and the processor 210 can repeatedly access the replacement content therein as desired. In this way, patch instances 610, 611 through 650, in accordance with the patch process logic 800, can replace original commands or instructions in the original boot code or the modified boot code 500. Each patch instance 610, 611 through 650 may include any number of instructions or commands and is limited only by the addressable storage capacity of the PROM 212 and the addressable storage capacity of the system memory 230. As described, the processor 210 is a physical element or mechanism for executing the sequence of instructions from the system memory 230.

In an alternative embodiment, the PROM 212 is arranged external to the SoC 120. This enables the PROM 212 to be programmed at a different place than the factory producing the SoC 120, thus allowing the SoC designer to manufacture the SoC 120 and then, later on, program the PROM 212, after the SoC 120 has been manufactured. For example, the PROM 212 may be programmed after a new feature is requested or after a bug has been found in the original boot code stored in ROM 190. The PROM 212 may be a one-time programmable (OTP) device or integrated circuit element, an erasable programmable read-only memory (EPROM), an electrically erasable programmable read-only memory (EEPROM), an electrically alterable read-only memory (EAROM), or any other known programmable memory, which can be programmed once or a number of times. In some embodiments, the GPIO bus 211 may be used as a mechanism for altering the data or a source for providing data and addresses in one or more of the patch instance 610, the patch instance 611 or the patch instance 650 among other patch instances stored in the PROM 212. As described, the PROM 212 is a physical mechanism or element for providing a set of addressable memory locations, having stored therein at least one patch instance.

The system memory 230 may be any volatile memory used for loading and unloading data during processing, such as a static random-access memory (SRAM). When the SoC 120 is powered, controller 214 transfers the original (i.e., unmodified) boot code or the modified boot code 500 from ROM 190 into the system memory 230, over bus 402, where the boot code awaits execution by processor 210. After the boot code is copied into the system memory 230, the patch process logic 800 is transferred from the ROM 190 into corresponding addresses of the system memory 230. As the instructions are processed or executed by the processor 210, a patch indicator directs the processor to branch to the patch process logic 800. If no patch has been identified, the patch instance identified by the patch indicator will be empty and no patch is available. When this is the case, the patch processing logic 800 directs the processor 210 to return to the next subsequent instruction in the modified boot code 500. Alternatively, when a patch is identified and the patch instance identified by the patch indicator is populated with one or more instructions, the instructions are executed until the patch instance is exhausted. Thereafter, the patch processing logic 800 directs the processor 210 to execute the next subsequent instruction in the modified boot code 500. Note that the patch instances can be transferred separately or together to the system memory 230. Alternatively, one or more patch instances 610, 611, . . . , 650 can be accessed by the controller 214 from the PROM 212 and read and copied into respective addresses in system memory 230 replacing the corresponding commands from the modified boot code 500 loaded from ROM 190. Thus, when processor 210 executes the modified boot code 500 from the system memory 230, it executes the patched or corrected code. In other embodiments, ROM 190, PROM 212, system memory 230, controller 214 and other parts of the SoC 120 may not share the same bus, and may have different combinations of interconnecting buses.

As described, the system memory 230 is a physical element or mechanism for temporarily storing the sequence of instructions and patch processing logic. The system memory 230 temporarily stores data and instructions as the data and instructions are lost when power is removed from the SoC 120.

As described, the controller 214 is a physical element or mechanism for loading the sequence of instructions and the patch processing logic from the ROM 190 to the system memory 230.

In some embodiments, the ROM 190 includes authentication logic 405 that enables an optional secure boot process. This secure boot process uses one or more mechanisms to authenticate the source of the processor instructions being loaded from one of the sources available for communicating or transporting such instructions into the SoC 120. As described the ROM 190 is a physical element or mechanism for storing a sequence of instructions such as the modified boot code 500, patch processing logic or patch process logic 800 and in some embodiments authentication logic 405.

Figure 5:
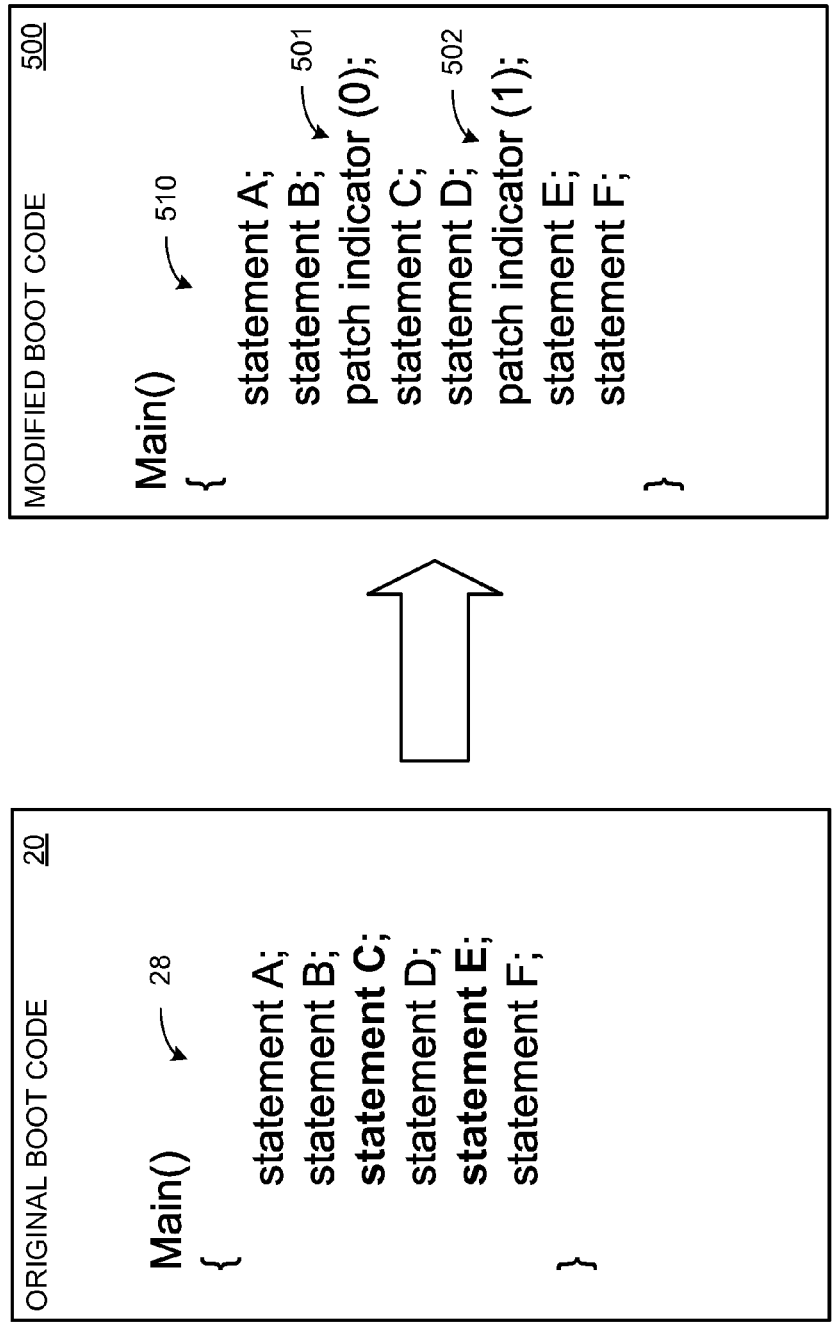
FIG. 5 is a schematic diagram illustrating an embodiment of an example boot ROM code sequence with two patch instances.

FIG. 5 is a schematic diagram illustrating exemplary embodiments of a boot ROM code sequence 20 and a modified boot code 500 with two patch instances inserted at strategic locations between statements or instructions. Code 20 is depicted in pseudo-code as a series or set of instructions or statements 28. Design engineers know from experience locations in such code sequences where patches or corrections are likely to be needed. Example locations are indicated in bold text in the first or unpatched boot code 20. Accordingly, a number of desired patch indicators are inserted immediately before the identified statements or instructions in the unmodified boot ROM code 20 to generate a modified boot ROM code 500. For example, a patch indicator 501, with an identifier or index of 0, is inserted between statement B and statement C. By way of further example, a patch indicator 502, with an identifier or index of 1, is inserted between Statement D and statement E. The modified boot code 500 includes a set or sequence of instructions or statements 510 with at least one patch indicator 501, 502. The strategic or desired locations in the boot ROM code sequence shown in bold text define a place in the sequence of instructions where a required change or correction is probable after the sequence of instructions is embodied in firmware. That is, hardware changes, silicon characterization, or other issues that are discovered after the SoC 120 design is completed may require changes in the in the boot ROM code sequence.

Figure 6:
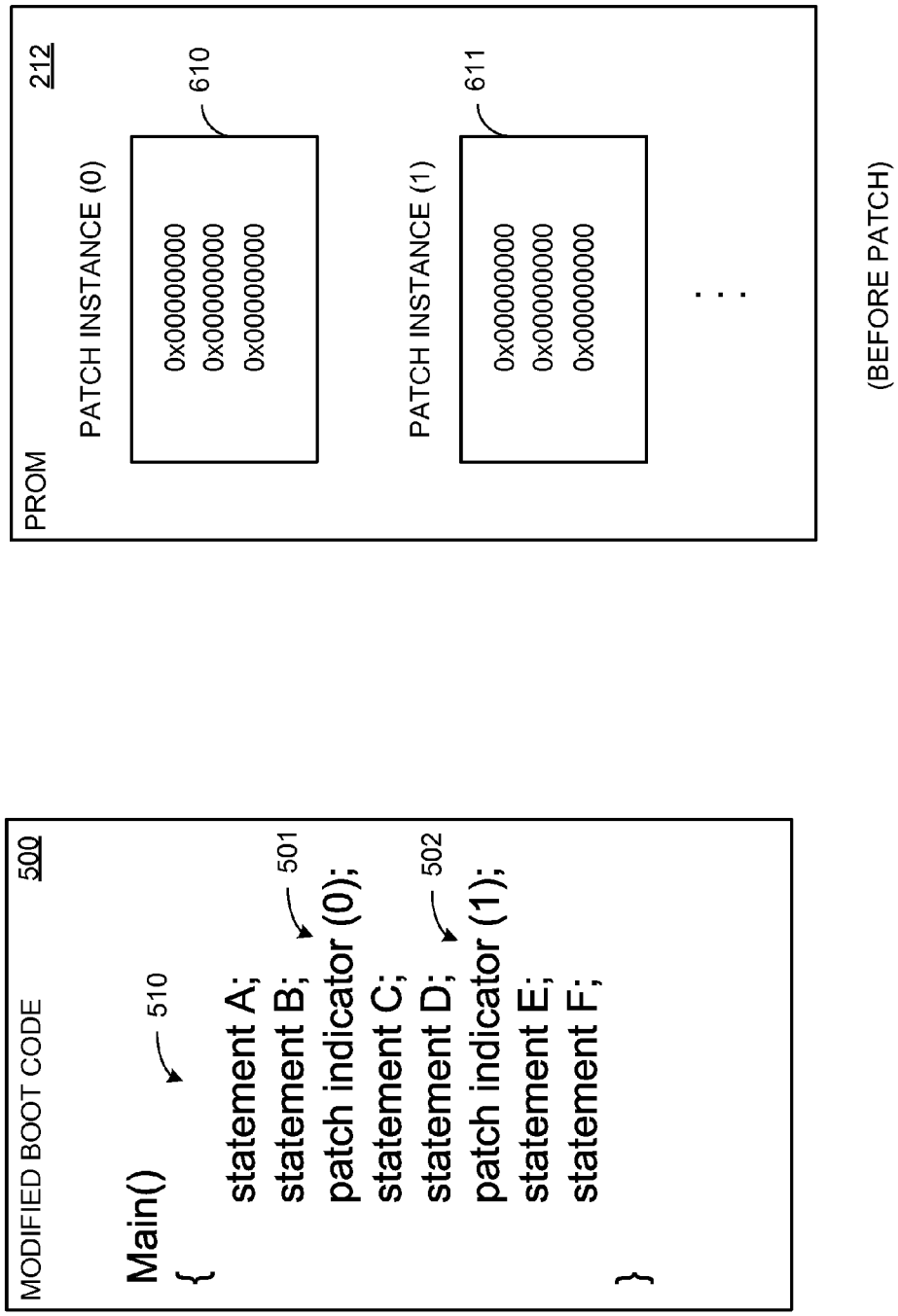
FIG. 6 is a schematic diagram illustrating an embodiment of the example boot ROM code sequence of FIG. 5 before patches are defined.

FIG. 6 is a schematic diagram illustrating an embodiment of the example boot ROM code or sequence 500 of FIG. 5 before patches are defined. That is, before a patch or modification is defined or required, the patch instance 610, which can be associated with the patch indicator 501 inserted between statement B and statement C, and the patch instance 611, which can be associated with the patch indicator 502 inserted between statement D and statement E, are empty. The patch instances are stored at respective addressable memory location in the PROM 212.

Figure 7:
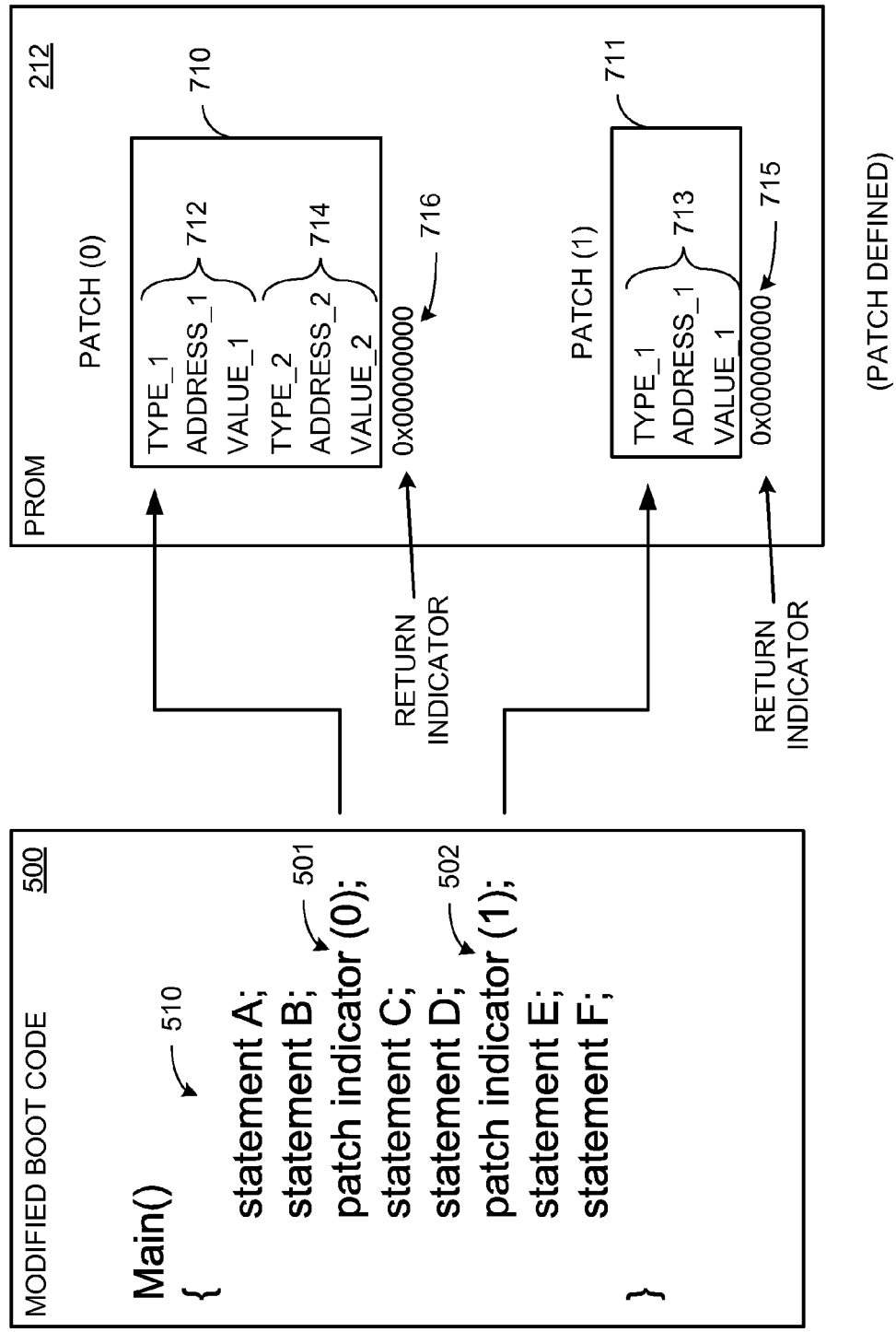
FIG. 7 is a schematic diagram illustrating example embodiments of two defined patches in the example boot ROM code sequence of FIG. 6.

FIG. 7 is a schematic diagram illustrating example embodiments of two defined patches in the example boot ROM code sequence 500 of FIG. 6. A first patch 710 includes two instructions. A first instruction 712 includes a type identifier or type code, an address and a datum or value. A second instruction 714 includes a type identifier or type code, an address and a datum or value. A return indicator 716 including all zero values follows the first patch 710. A second patch 711 includes a single instruction 713. In the illustrated embodiment, each instruction is defined by an instruction type, an address and a data or value. After the instructions, an empty word or word with all zero values indicates to the ROM patch process that the processor should return to the next subsequent instruction or statement in the boot ROM code sequence 500.

Figure 8:
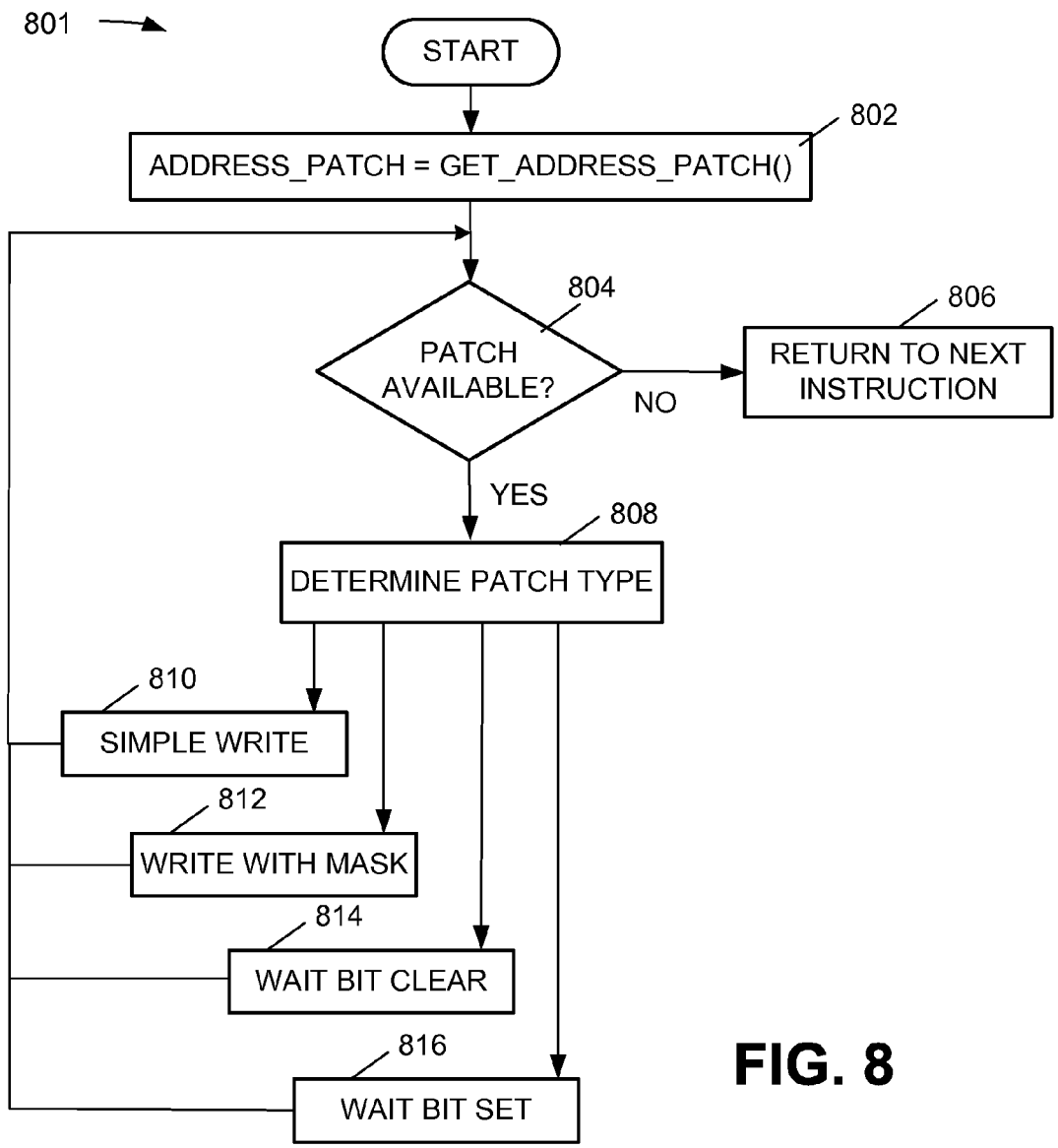
FIG. 8 is a flow diagram illustrating an embodiment of the improved ROM patch process as enabled by the patch logic of FIG. 4.

FIG. 8 is a flow diagram illustrating an embodiment of the improved ROM patch process as enabled by the patch process logic 800 introduced in FIG. 4. As described, the improved ROM patch process dynamically vectors to addressable memory locations accessible to a processor, such as the multicore processor 210, over a bus. The improved ROM patch process handles common categories of changes necessitated post-silicon characterization on an as needed basis. The common instructions include a write instruction, a write with mask instruction, a wait until a bit is clear instruction, and a wait until a bit is set instruction. When executed, the patch process logic 800 directs a processor to retrieve an address from a source other than the sequence of instructions, determine whether patch data is available at the address. When patch data is not available at the address, the processor 210 is directed to return to a next subsequent instruction in the sequence of instructions. Otherwise, the processor 210 is directed to execute the instructions in the patch data, and return to the next subsequent instruction in the sequence of instructions once the patch is exhausted. It should be understood that the present instruction architecture can be extended and/or modified as may be desired to support additional instructions.

The patch process logic 800 embodies a method 801 that begins with block 802 where an address is retrieved or identified. As described, a set of one-time programmable fuses may be used to identify an address in a boot ROM code sequence that should be overwritten or patched. In decision block 804, it is determined whether a patch is available at the identified address. A patch is considered available when the patch instance is populated with an instruction type, a patch address and for some instructions a data field. A patch is considered unavailable when the identified address is empty or includes all zero values. Such an address location includes empty content. When this is the case, as indicated by the flow control arrow labeled "No," exiting decision block 804, the improved ROM patch process is arranged to return to the next subsequent instruction, as shown in block 806. Otherwise, when the patch is available (i.e., when there is non-zero bits at the location identified by the address, a patch type is determined or identified, as indicated in block 808. As further indicated in the flow diagram, when the patch type identified in block 808 indicates a simple write is desired, the method 801 branches to the corresponding logic and executes the same, as indicated in block 810, before returning to repeat the functions associated with blocks 804 through 808. When the patch type identified in block 808 indicates a write with mask instruction is desired, the method 801 branches to the corresponding logic and executes the write with mask instruction, as indicated in block 812, before returning to repeat the functions associated with blocks 804 through 808. When the patch type identified in block 808 indicates a wait until bit is clear instruction is desired, the method 801 branches to the wait until a bit is clear logic and executes the wait until bit is clear instruction, as indicated in block 814, before returning to repeat the functions associated with blocks 804 through 808. Similarly, when the patch type identified in block 808 indicates a wait until bit is set instruction is desired, the method 801 branches to the corresponding logic and executes the wait until bit is set instruction, as indicated in block 816, before returning to repeat the functions associated with blocks 804 through 808. Although four common instructions are illustrated and described, those skilled in the art can modify or otherwise adapt the instruction architecture described herein to enable additional instructions as may be desired.

FIGS. 9A &9B illustrate example embodiments of a write instruction 900 and a write with mask instruction 950, respectively. As shown in FIG. 9A, the write instruction 900, which may be represented in a pseudo-code statement as "OUT(address, value);" is defined by a first word 910, a second word 920 and a third word 930. Each of the three words includes N bits where N is an integer. In the illustrated embodiment, the words are 32 bits in length. The first 29 bits of the first word 910 are reserved or define a reserved region 912. The following three bits of the first word 910 include a code that defines the instruction type in a type region 914. In the example embodiment, the write instruction is identified by "000." As further indicated in FIG. 9A, the address is defined in the second word 920 and the data or value information is defined in the third word 930.

The write instruction in the example embodiment may be identified or arranged using other codes of various lengths or positions. Furthermore, the sequence of the first, second and third words may be modified from the illustrated embodiment as may be desired. Moreover, the length of the words used to represent the example write instruction may be varied to apply in a system or systems that deploy addresses and data in other than 32 bits.

As shown in FIG. 9B, a write with mask instruction 950, is represented by a first word 960 including a reserved region 962, a mask region 964 and a type region 966. The mask region 964 includes mask information. The type region 966 includes a code that identifies the instruction type. The three words of the write with mask instruction 950 include N bits where N is an integer. The write with mask instruction may be represented in pseudocode by "New_value =IN(address); New_value&=mask; New_value|=value; OUT(address, New_value);" The first 24 bits of the first word 962 are in the reserved region 962. In the example embodiment, the write with mask instruction 950 is identified by the following or last eight bits of the first word 960, with bits 25 through 29 defining the mask and bits 30 through 32 defining the instruction type with the code "001." As further indicated in FIG. 9B, the address is defined in the second word 970 and the data or value information is defined in the third word 980.

The write with mask instruction in the example embodiment may be identified or arranged using other codes of various lengths or positions. For example, a set of mask bits or mask information may use more or less than 5 bits and may be located anywhere over the range of bits that are not used to encode the instruction type. Furthermore, the sequence of the first word 960, the second word 970 and third word 980 may be modified from the illustrated embodiment as may be desired. Moreover, the length of the words used to represent the example write with mask instruction 950 may be varied to apply in a system or systems that deploy addresses and data in other than 32 bits.

FIGS. 10A & 10B illustrate example embodiments of a wait until a bit is clear instruction 1000 and a wait until a bit is set instruction 1050, respectively. As shown in FIG. 10A, a wait until bit is clear instruction 1000, is represented by a first word 1010 that includes a reserved region 1012, a mask region 1014 and a type region 1016. The mask region 1014 includes mask information. The type region 1016 includes a code that identifies the instruction type. The words of the wait until bit is clear instruction 1000 include N bits where N is an integer. The wait until a bit is clear instruction 1000 may be represented in pseudo-code by "While (IN(address, mask)!=0)." The first 24 bits of the first word 1010 are reserved. In the example embodiment, the mask region 1014 is defined in bits 25 through 29 and the type region 1016 is located in bits 30 through 32 of the first word 1010. In the illustrated embodiment, the wait until bit is clear instruction 1000 is defined by the code "010." As further indicated in FIG. 10A, the address is defined in the second word 1020.

The wait until a bit is clear instruction 1000 in the example embodiment may be identified or arranged using other codes of various lengths or positions. For example, a set of mask bits or mask information may use more or less than 5 bits and may be located anywhere over the range of bits that are not used to encode the instruction type. Furthermore, the sequence of the first word 1010 and second word 1020 may be modified from the illustrated embodiment as may be desired. Moreover, the length of the words used to represent the example wait until a bit is clear instruction 1000 may be varied to apply in a system or systems that deploy addresses and data in other than 32 bits.

A wait until bit is set instruction 1050 is illustrated in FIG. 10B. The wait until bit is set instruction 1050 instruction includes a first word 1060 that includes a reserved region 1062, a mask region 1064 and a type region 1066 and a second word 1070 that includes address information. Each of the first word 1060 and the second word 1070 includes N bits where N is an integer. The wait until a bit is set instruction 1050 is represented in pseudo-code by the expression "While (IN(address, mask)!=1)." The first 24 bits of the first word 1060 are in the reserved region 1062. The mask region 1064 is located in bits 25 through 29 and the type region 1066 is in bits 30 through 32. In the illustrated embodiment, the wait until bit is set instruction 1050 is defined by the code "011."

The wait until a bit is set instruction 1050 in the example embodiment may be identified or arranged using other codes of various lengths or positions. For example, a set of mask bits or mask information may use more or less than 5 bits and may be located anywhere over the range of bits that are not used to encode the instruction type. Furthermore, the sequence of the first word 1060 and second word 1070 may be modified from the illustrated embodiment as may be desired. Moreover, the length of the words used to represent the example wait until a bit is set instruction 1050 may be varied to apply in a system or systems that deploy addresses and data in other than 32 bits.

It should be further understood that the instructions illustrated in FIGS. 9A, 9B, 10A, and 10B are presented by way of example only. Thus, the present system and methods are not limited to these instructions. Accordingly, these example instructions or any number of additional instructions, however encoded and arranged, may be generated and deployed as may be desired.

Figure 11:
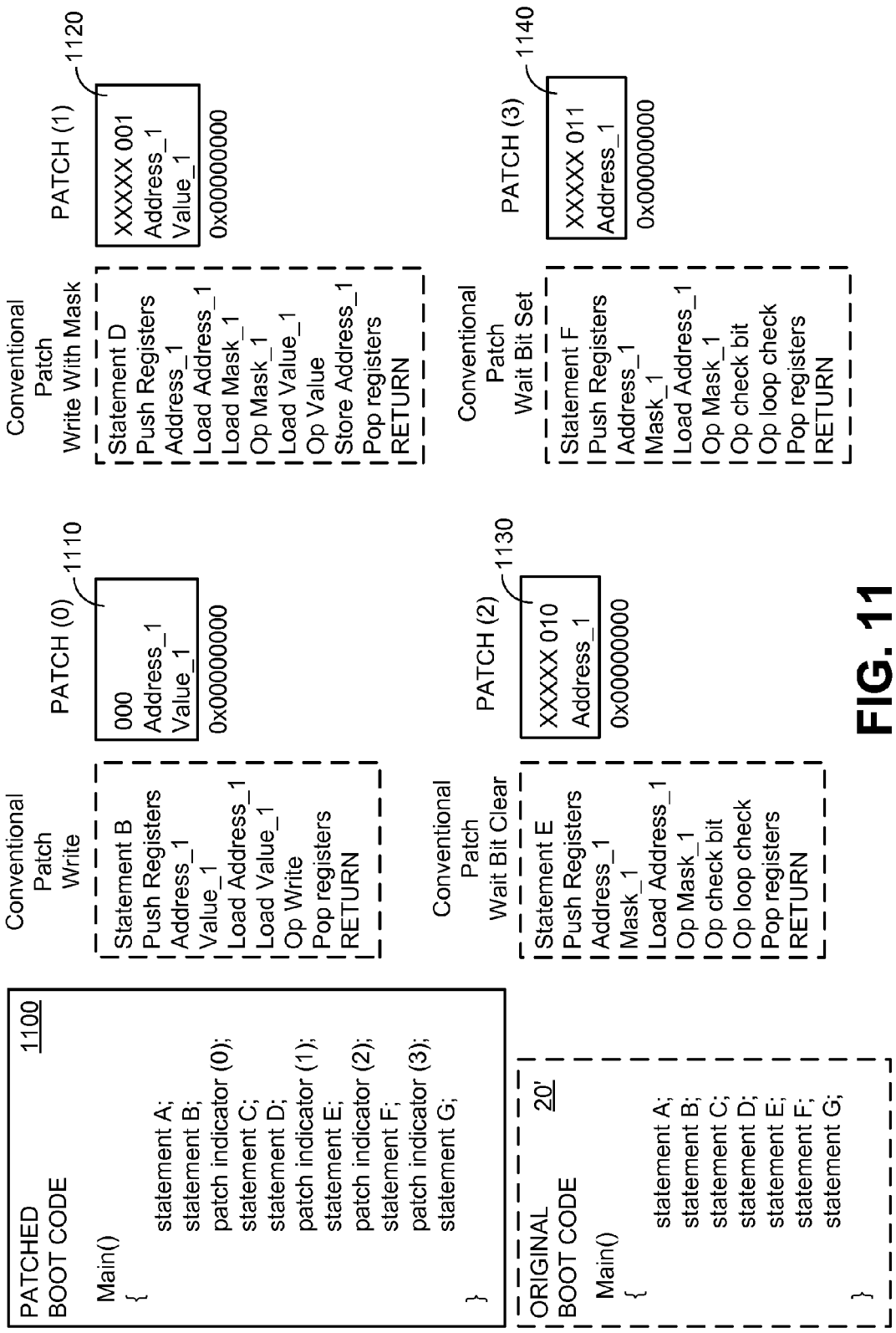
FIG. 11 is a schematic diagram illustrating an example embodiment of a boot sequence and a set of hypothetical patches.

FIG. 11 is a schematic diagram illustrating an example embodiment of a patched boot code sequence 1100. To illustrate the significance of the savings in one-time programmable fuses enabled with the present system and methods, four example patches are shown side-by-side with a conventional patch for the same instruction. For example, a patch 1110, identified in the patched boot code 1100 by patch indicator (0), includes a write instruction as indicated by the code 000. As defined above, the write instruction is defined in three N bit words. The return indicator, which includes all zeros is not part of the patch and does not change when a patch is defined and stored in the addressable memory. Thus, the improved instruction architecture and process enable a savings of six fuse locations over the conventional patch implementation which consumes a total of nine fuses.

By way of further example, patch 1120, identified in the patched boot code 1100 by patch indicator (1), includes a write with mask instruction, as indicated by the mask bits and code 001. As defined above, the write with mask instruction is defined in three N bit words. Thus, the improved instruction architecture and process enable a savings of eight fuse locations over the conventional patch implementation, which consumes a total of eleven fuses.

Patch 1130, identified in the patched boot code 1100 by patch indicator (2), includes a wait until bit is clear instruction, as indicated by the mask bits XXXXX and code 010. As defined above, the wait until bit is clear instruction is defined in two words. As illustrated, the improved instruction architecture and process enables a savings of eight fuses when compared to the conventional patch implementation, which consumes a total of ten fuse locations.

Patch 1140, identified in the patched boot code 1100 by patch indicator (3), includes a wait until bit is set instruction, as indicated by mask bits XXXXX and the code 011 in bits 30-32 of the first word. As defined above, the wait until bit is set instruction provides an address in the second word of the patch 1140. Thus, the improved instruction architecture and process enable a savings of eight fuse locations over the conventional patch implementation, which consumes a total of ten fuses.

Each of the original boot code 20', patched boot code 1100, conventional patches (as indicated in broken lines), and the improved patches or patch instances (0)-(3) are presented by way of example only. The present system and methods are not limited to these instruction sequences or patch instruction architectures. Those skilled in the art will understand how to make and use an improved ROM including the above-described patch process logic in any of a number of variations consistent with the claimed systems and methods.

Figure 12:
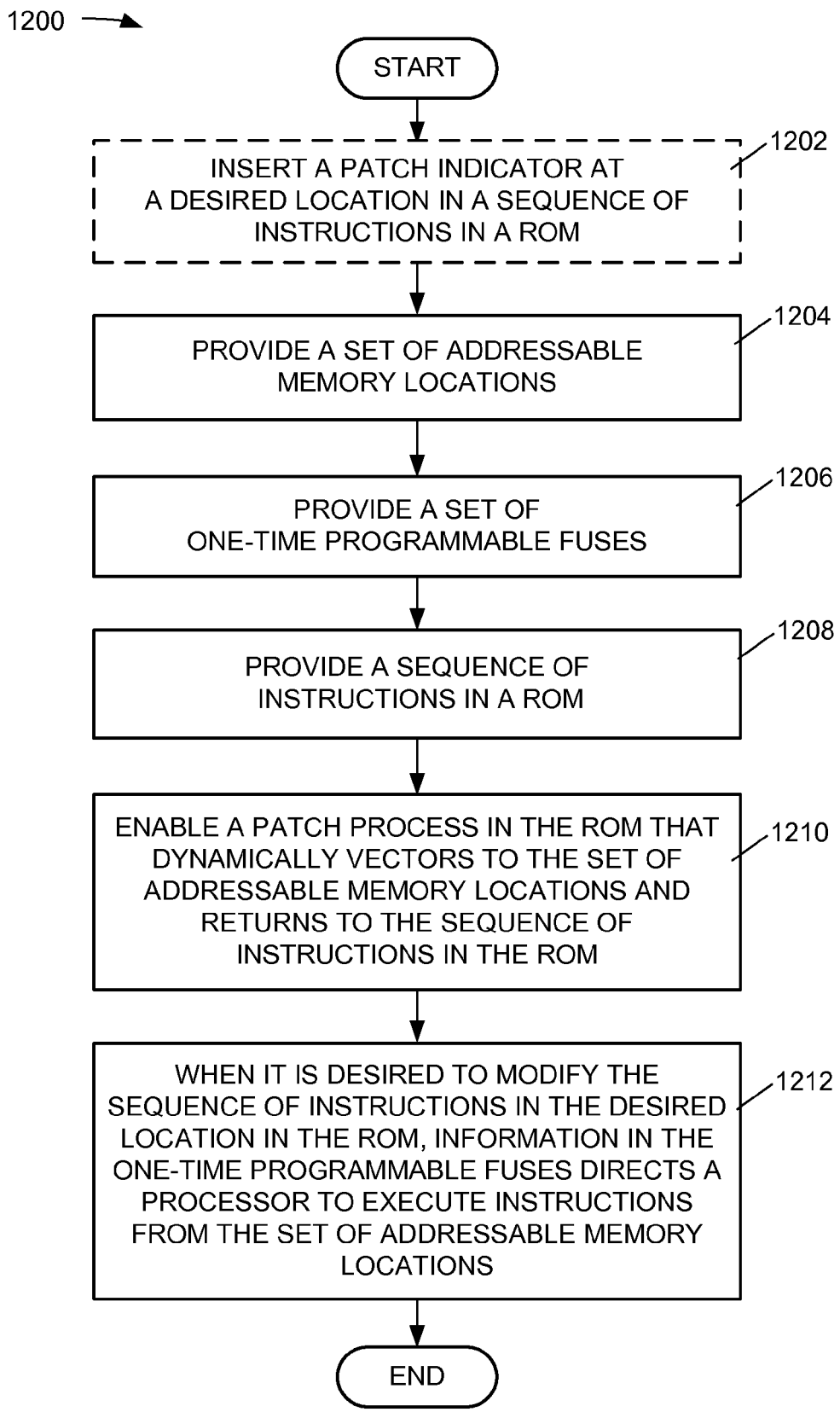
FIG. 12 is a flow diagram of an example embodiment of a method for modifying a sequence of instructions in a read-only memory.

FIG. 12 is a flow diagram of an example embodiment of a method 1200 for modifying (i.e., patching) a sequence of instructions in a ROM. The method begins with block 1202 where a patch indicator is inserted at a desired location in a sequence of instructions in a ROM. Block 1202 is illustrated in broken line to show that the insertion of a patch indicator in the sequence of instructions stored in a ROM can be made in an optional preliminary step. In block 1204, a set of addressable memory locations are provided. As indicated above, the set of addressable memory locations are preferably enabled by a programmable ROM or PROM 212. In conjunction with the optional preliminary step of inserting at least one patch indicator at a desired location in the sequence of instructions in the read-only memory, at least one patch instance is stored in the set of addressable memory locations. Preferably, an index or other identifier associates the patch indicator with a respective patch instance at an addressable memory location in the PROM 212. Before a change is required to the sequence of instructions in the ROM 190, the patch instances stored in the PROM 212 may include empty content. In block 1206, a set of one-time programmable fuses are provided. The one-time programmable fuses may be "opened" by controlled application of a high voltage signal, exposure to ultraviolet radiation, or other mechanisms. Thus, the one-time programmable fuses may be controllably modified to reflect one or more addresses in the set of addressable memory locations. In block 1208, a sequence of instructions is provided in a ROM. In block 1210, a patch process is enabled in the ROM. The patch process dynamically vectors or jumps to the set of addressable memory locations and upon encountering a return indicator, returns to the sequence of instructions in the ROM. As shown in block 1212, when it is desired to patch or modify the sequence of instructions in the desired location in the ROM, information communicated by the one-time programmable fuses directs a processor or controller to load and execute instructions stored in the set of addressable memory locations, inserting at least one patch indicator at a desired location in the sequence of instructions in the read-only memory, wherein at least one patch instance in the set of addressable memory locations as defined by the at least one patch indicator includes empty content before a correction to the sequence of instructions in the read-only memory is identified While the ROM 190 and its patch process logic 800 are preferably enabled in a circuit, the logic represented therein may be stored on a non-transitory computer readable medium and available for transport or for making copies as may be desired. FIG. 13 includes a schematic representation of a computer-readable medium 1300 that includes patch process logic 800 stored therein. As indicated in FIG. 13, the patch process logic 800 includes indicator logic 1310, instance logic 1320, type logic 1330 and return logic 1340. Indicator logic 1310 directs a processor to identify when a patch indicator is present in a sequence of instructions or statements. Instance logic 1320 directs a processor to identify when an addressable memory location includes non-zero bits (i.e., non-empty content). Type logic 1330 directs a processor to identify an instruction by decoding information in a type region embedded in the patch instance. Return logic 1340 directs a processor upon encountering a series of zero bits to return to the next subsequent instruction in the sequence of instructions or statements.

In addition to the above described logic, other data and/or processor instructions may be stored on a computer-readable medium for transport via a download mode of operation onto the SoC 120 for storage in the PROM 212. When stored a computer-readable medium, these other instructions and corresponding data are also available for transport or for making copies as may be desired.

As described, the one or more non-transitory computer-readable medium or media may have stored thereon processor instructions that when executed direct the processor 210 to configure a computing device responsive to one of a download or programming mode of operation that receives processor executable logic and/or data from a source other than the computing device.

As further described processor instructions responsive to one or more input signals received from a GPIO bus 211 or a programmable eFuse element 192 may be used to identify a download mode, an optional authentication mode and a default boot mode.

Certain steps in the processes or process flows described in this specification naturally precede others for the invention to function as described. However, the present system and methods are not limited to the order of the steps described if such order or sequence does not alter the functionality of the above-described systems and methods. That is, it is recognized that some steps may be performed before, after, or in parallel (substantially simultaneously) with other steps. In some instances, certain steps may be omitted or not performed without departing from the above-described systems and methods. Further, words such as "thereafter", "then", "next", "subsequently", etc. are not intended to limit the order of the steps. These words are simply used to guide the reader through the description of the exemplary method.

Additionally, one of ordinary skill in writing boot programs and/or circuit architecture is able to write computer code or identify appropriate hardware and/or circuits to implement the disclosed invention without difficulty based on the flow charts and associated examples in this specification. Therefore, disclosure of a particular set of program code instructions or detailed hardware devices is not considered necessary for an adequate understanding of how to make and use the systems and methods. The inventive functionality of the claimed processor-enabled processes is explained in more detail in the above description and in conjunction with the drawings, which may illustrate various process flows.

In one or more exemplary aspects as indicated above, the functions described may be implemented in hardware, software, firmware, or any combination thereof. If implemented in software, the functions may be stored as one or more instructions or code on a computer-readable medium, such as a non-transitory processor-readable medium. Computer-readable media include data storage media.

A storage media may be any available media that may be accessed by a computer or a processor. By way of example, and not limitation, such computer-readable media may comprise RAM, ROM, EEPROM, Flash, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of non-transitory computer-readable media.

Although selected aspects have been illustrated and described in detail, it will be understood that various substitutions and alterations may be made herein without departing from the present systems and methods, as defined by the following claims.

What is claimed is:

1. A method for modifying a sequence of instructions in a read-only memory, the method comprising:
   providing set of addressable memory locations coupled to a processor; providing a set of one time programmable fuses further coupled to the processor; providing a sequence of instructions in a read-only memory coupled to the processor the sequence of instructions in the read only memory including at least one patch indicator at a desired location before a first instruction in the sequence of instructions, the at least one patch indicator identifying a patch instance: and
   enabling a patch process in the read-only memory that dynamically vectors to identified locations in the set of addressable memory locations and returns to the first instruction in the sequence of instructions in the read-only memory, wherein the patch instance includes mask information and is defined in no more than two words of N bits, where N is an integer, wherein when it is desired to modify the sequence of instructions, the patch instance comprising an instruction type, an address, and a return indicator is populated in one of the set of addressable memory locations, and information in the set of one time programmable fuses directs the processor to execute the patch instance stored in the addressable memory location, the patch instance executing based on the instruction type.

2. The method of claim 1, wherein at least one patch instance identified by the at least one patch indicator includes empty content before a modification to the sequence of instructions in the read-only memory is identified.

3. The method of claim 2, wherein the desired location defines a place in the sequence of instructions where a modification is probable after the sequence of instructions is embodied in firmware.

4. The method of claim 1, wherein after a modification to the sequence of instructions in the read-only memory the one patch instance further includes a data field.

5. The method of claim 1, wherein the instruction type is defined by a code.

6. The method of claim 1, wherein the patch instance is defined in words of N bits, where N is an integer.

7. The method of claim 1, wherein enabling the patch process in the read-only memory includes providing replacement content only for the patch indicator.

8. The method of claim 7, wherein enabling the patch process in the read-only memory includes executing patch process logic that integrates desired changes after the sequence of instructions is embodied in firmware.

9. The method of claim 8, wherein the patch process logic directs a processor to retrieve an address from a source other than the sequence of instructions, determine whether the patch instance at the address is populated with data, when data is not populated at the address, return to the first instruction in the sequence of instructions, otherwise, execute at least one instruction in the patch instance, and return to the first instruction in the sequence of instructions.

10. The method of claim 9, wherein the processor is directed to retrieve the address from the source other than the sequence of instructions by accessing the set of one time programmable fuses to authenticate and define the addressable location where the patch instance is stored.

* * * * *